US012768854B2

(12) United States Patent
Miyake et al.

(10) Patent No.: US 12,768,854 B2
(45) Date of Patent: Oct. 20, 2026

(54) AUTOMATIC ANALYZER

(71) Applicant: Hitachi High-Tech Corporation, Tokyo (JP)

(72) Inventors: Yuka Miyake, Tokyo (JP); Koshin Hamasaki, Tokyo (JP); Eiichiro Takada, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 658 days.

(21) Appl. No.: 18/036,522

(22) PCT Filed: Oct. 15, 2021

(86) PCT No.: PCT/JP2021/038191
§ 371 (c)(1),
(2) Date: May 11, 2023

(87) PCT Pub. No.: WO2022/123908
PCT Pub. Date: Jun. 16, 2022

(65) Prior Publication Data

US 2024/0012019 A1 Jan. 11, 2024

(30) Foreign Application Priority Data

Dec. 11, 2020 (JP) ................................ 2020-205500

(51) Int. Cl.
*G01N 35/10* (2006.01)

(52) U.S. Cl.
CPC ..... *G01N 35/1009* (2013.01); *G01N 35/1002* (2013.01); *G01N 35/1004* (2013.01)

(58) Field of Classification Search
CPC ........... G01N 35/1009; G01N 35/1002; G01N 35/1004
See application file for complete search history.

(56) References Cited

U.S. PATENT DOCUMENTS 3,912,456 A * 10/1975 Young ..................... H01L 21/00 73/864.22
4,456,037 A * 6/1984 Gocho ............... G01N 35/1004 141/130

(Continued)

FOREIGN PATENT DOCUMENTS

JP 11-352132 A 12/1999
JP 2001-074756 A 3/2001

(Continued)

OTHER PUBLICATIONS

International Search Report of PCT/JP2021/038191 dated Dec. 21, 2021.

(Continued)

*Primary Examiner* — Charles Capozzi
*Assistant Examiner* — Alex Ramirez
(74) *Attorney, Agent, or Firm* — MATTINGLY & MALUR, PC

(57) ABSTRACT

An automatic analyzer performs a dispensing operation with high throughput while reducing a risk of carry-over of a reagent that includes first and second dispensing operations. The second dispensing operation includes a first procedure of aspirating a sample accommodated by a dispensing nozzle, a second procedure of discharging the aspirated sample to a first reaction container, a third procedure in which a cleaning tank cleans an inner side and an outer side of the dispensing nozzle after the second procedure, a fourth procedure of aspirating the reagent accommodated in a reagent container after the third procedure, a fifth procedure B5 in which the cleaning tank cleans the outer side of the dispensing nozzle after the fourth procedure, a sixth procedure of aspirating the sample accommodated in the first reaction container after the fifth procedure, and a seventh (Continued)

procedure of discharging the reagent and the sample to a second reaction container.

10 Claims, 4 Drawing Sheets

(56) References Cited

U.S. PATENT DOCUMENTS

| | | | |
|---|---|---|---|
| 2019/0204304 A1 | 7/2019 | Shiba et al. | |
| 2019/0369132 A1* | 12/2019 | Nonaka | B01L 13/02 |
| 2021/0025911 A1 | 1/2021 | Adachi et al. | |
| 2022/0057422 A1 | 2/2022 | Fukushi et al. | |
| 2022/0178960 A1 | 6/2022 | Joji | |
| 2022/0196691 A1 | 6/2022 | Takada et al. | |

FOREIGN PATENT DOCUMENTS

| | | |
|---|---|---|
| JP | 2019-120509 A | 7/2019 |
| JP | 2019-163991 A | 9/2019 |
| WO | 2020/071163 A1 | 4/2020 |
| WO | 2020/217636 A1 | 10/2020 |
| WO | 2020/235134 A1 | 11/2020 |

OTHER PUBLICATIONS

Extended European Search Report received in corresponding European Application No. 21903012.9 dated Sep. 23, 2024.

International Preliminary Report on Patentability received in corresponding International Application No. PCT/JP2021/038191 dated Jan. 17, 2023.

* cited by examiner

[FIG. 1]
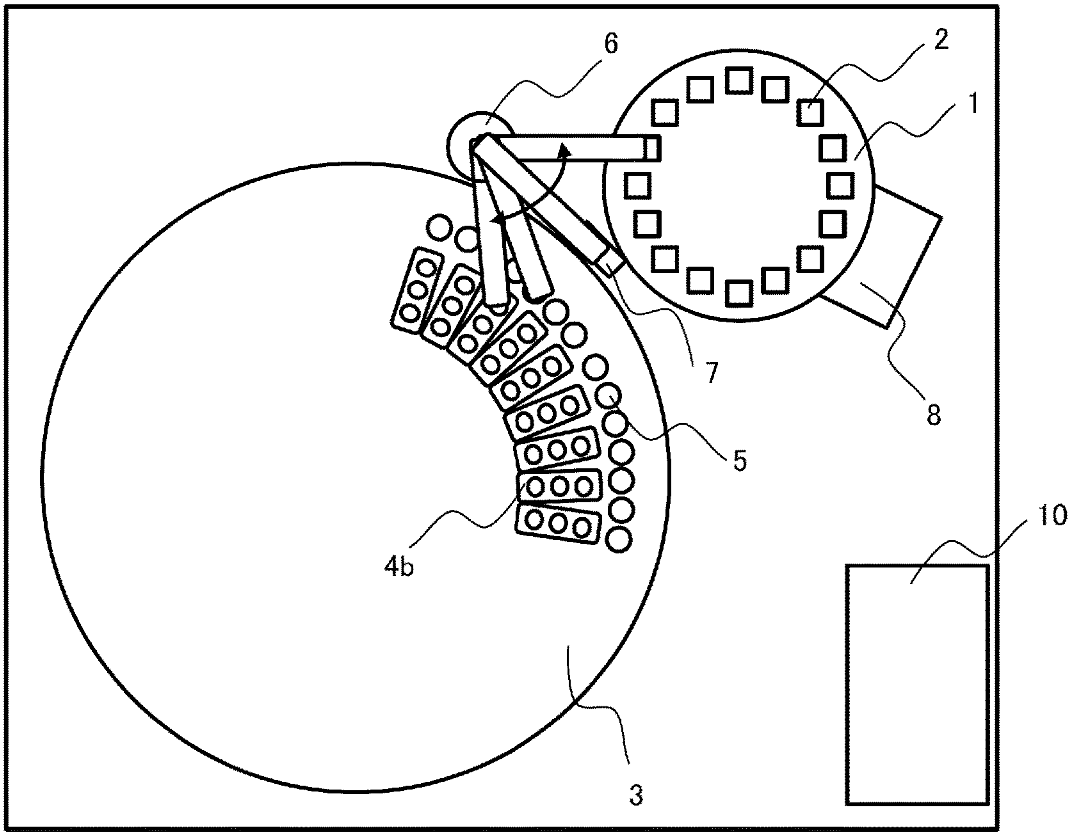
[FIG. 2A]
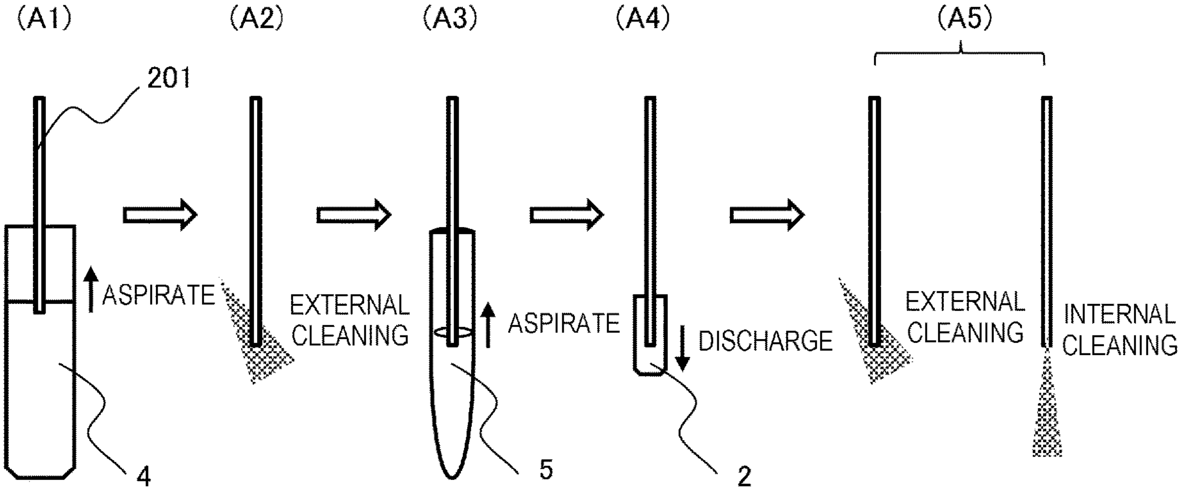

[FIG. 2B]
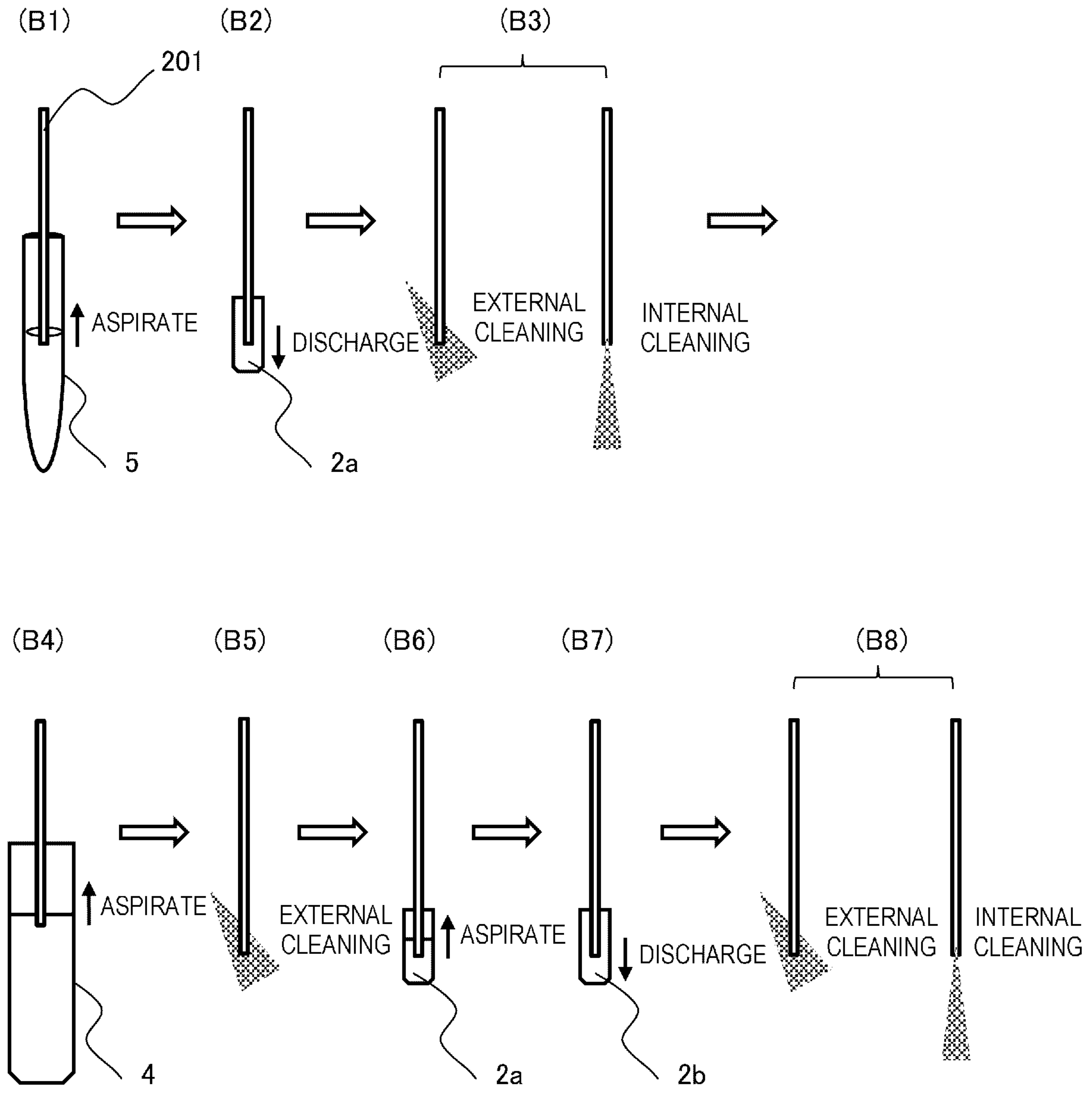

[FIG. 4]
401
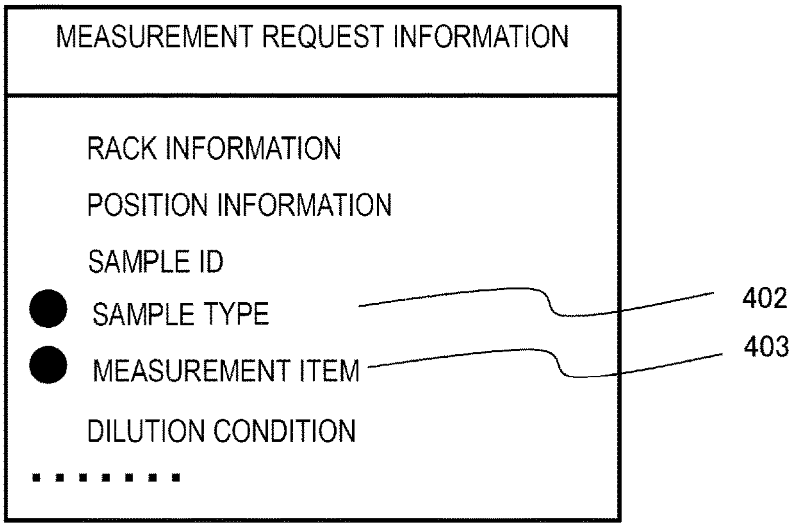
[FIG. 5A]
501a
| CASE ID | SAMPLE TYPE | CARRY-OVER AVOIDANCE DISPENSING OPERATION |
|---|---|---|
| 1 | A | NO (NORMAL OPERATION) |
| 2 | B | YES |
[FIG. 5B]
501b
| CASE ID | SAMPLE TYPE | MEASUREMENT ITEM | CARRY-OVER AVOIDANCE DISPENSING OPERATION |
|---|---|---|---|
| 1 | A | A | NO (NORMAL OPERATION) |
| 2 | A | B | NO (NORMAL OPERATION) |
| 3 | B | A | NO (NORMAL OPERATION) |
| 4 | B | B | YES |

AUTOMATIC ANALYZER

TECHNICAL FIELD

The present invention relates to an automatic analyzer.

BACKGROUND ART

As an automatic analyzer, a biochemical analyzer and an immunoanalyzer that analyze a biological component contained in a sample (a specimen) such as blood and urine are known. The automatic analyzer optically measures a concentration of a mixed liquid generated by a reaction between a sample and a mixed liquid used for analysis of each inspection item, activity of an enzyme, and the like.

PTL 1 discloses an automatic analyzer in which different dispensing mechanisms are used based on a reaction process, and each dispensing mechanism dispenses both a sample and a reagent with the same dispensing nozzle, and stirs a mixed liquid of the sample and the reagent by a pipetting operation.

CITATION LIST

Patent Literature

PTL 1: WO2020/217636

SUMMARY OF INVENTION

Technical Problem

The inventors have examined a sequence of a dispensing operation capable of increasing throughput of the automatic analyzer as disclosed in PTL 1. Since cleaning an inner side and an outer side of a dispensing nozzle for every dispensing operation leads to a decrease in throughput and an increase in an amount of cleaning water used, it is preferable to perform a dispensing operation in which the number of cleaning is reduced as much as possible.

Therefore, after examining a sequence in which the reagent is first aspirated from a reagent container, only the outer side of the dispensing nozzle is cleaned, the sample is then aspirated from a sample container, and the aspirated reagent and sample are discharged into a reaction container and stirred, it has been found that carry-over between the reagent and the sample can occur in some test items. For example, a nephelometric reagent contains a protein. According to the sequence as described above, when the nephelometric reagent adhering to the inner side of the dispensing nozzle is mixed into the sample in the sample container, even an amount of protein mixed is fairly small, in a case of a sample having a low protein concentration such as urine, an erroneous measurement result such as a false high value may be generated due to the mixed nephelometric reagent.

Solution to Problem

An automatic analyzer according to an aspect of the invention includes: a dispensing mechanism that includes a dispensing nozzle and dispenses a sample or a reagent into a reaction container; a cleaning tank that cleans the dispensing nozzle; and a control unit that controls the dispensing mechanism and the cleaning tank to dispense the sample and the reagent into the reaction container by a first dispensing operation or a second dispensing operation.

The first dispensing operation includes a first procedure in which the dispensing mechanism aspirates the reagent accommodated in a reagent container by the dispensing nozzle, a second procedure in which the cleaning tank cleans an outer side of the dispensing nozzle after the first procedure, a third procedure in which the dispensing mechanism aspirates the sample accommodated in a sample container by the dispensing nozzle after the second procedure, and a fourth procedure in which the dispensing mechanism discharges the reagent and the sample aspirated in the first procedure and the third procedure to the reaction container after the third procedure.

The second dispensing operation includes a first procedure in which the dispensing mechanism aspirates the sample accommodated in the sample container by the dispensing nozzle, a second procedure in which the dispensing mechanism discharges the sample aspirated in the first procedure to a first reaction container after the first procedure, a third procedure in which the cleaning tank cleans an inner side and the outer side of the dispensing nozzle after the second procedure, a fourth procedure in which the dispensing mechanism aspirates the reagent accommodated in the reagent container by the dispensing nozzle after the third procedure, a fifth procedure in which the cleaning tank cleans the outer side of the dispensing nozzle after the fourth procedure, a sixth procedure in which the dispensing mechanism aspirates the sample accommodated in the first reaction container by the dispensing nozzle after the fifth procedure, and a seventh procedure in which the dispensing mechanism discharges the reagent and the sample aspirated in the fourth procedure and the sixth procedure to a second reaction container after the sixth procedure.

Advantageous Effects of Invention

An automatic analyzer capable of performing a dispensing operation with high throughput while reducing a risk of carry-over of a reagent is provided.

Other problems and novel characteristics will become apparent from a description of the present specification and the accompanying drawings.

BRIEF DESCRIPTION OF DRAWINGS

FIG. 1 is a schematic diagram of a mechanism associated with a dispensing mechanism of an automatic analyzer.

FIG. 2A shows a procedure of a normal dispensing operation.

FIG. 2B shows a procedure of a carry-over avoidance dispensing operation.

FIG. 4 shows an example of measurement request information data.

FIG. 5A shows an example of a determination table.

FIG. 5B shows an example of a determination table.

DESCRIPTION OF EMBODIMENTS

Figure 3A:
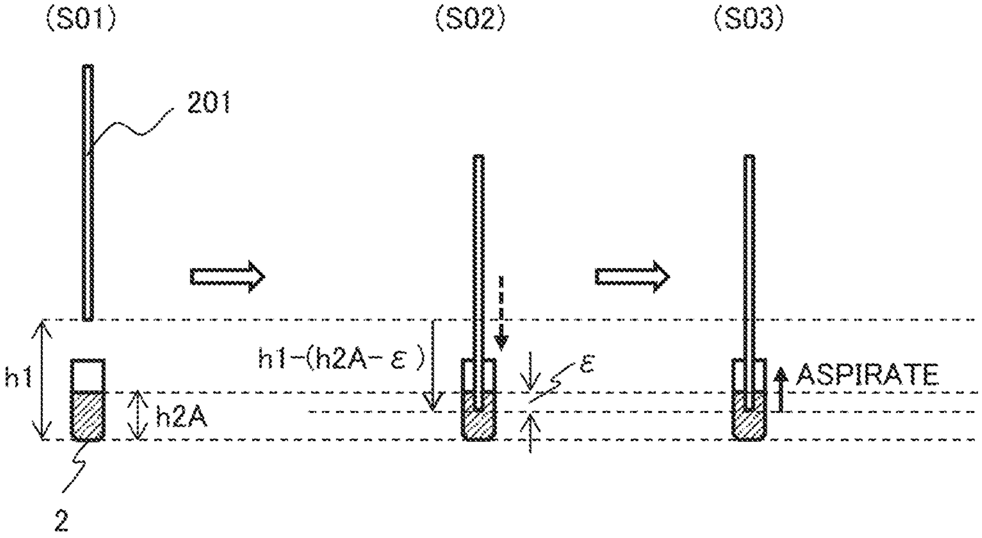
FIG. 3A is a diagram showing a standard aspiration operation.

Hereinafter, an embodiment of the invention will be described with reference to the drawings. In the drawings, common components and similar components are denoted by the same reference numerals, and redundant description will be omitted as appropriate.

FIG. 1 schematically shows a configuration related to a dispensing mechanism of an automatic analyzer. In FIG. 1, reaction containers 2 are arranged on a circumferential position of an incubator (a reaction disk) 1. The reaction containers 2 are commonly used for all reactions. The incubator 1 is controlled to be rotationally driven by a driving mechanism such as a motor.

A plurality of reagent bottles 4*b* and sample containers 5 can be placed on a reagent and sample common accommodating portion 3. Each of the reagent bottles 4*b* is a combination of a plurality of (here, three) reagent containers 4 each accommodating a reagent. In this example, the reagent bottle 4*b* is located on an inner periphery of the sample container 5. However, the sample container 5 may be located on an inner periphery of the reagent bottle 4*b*, or the reagent bottle 4*b* and the sample container 5 may be located separately in a circumferential direction rather than in a radial direction. Further, although an example of the reagent and sample common accommodating portion 3 is shown here, accommodating portions for a reagent and a sample may be separate.

Between the incubator 1 and the reagent and sample common accommodating portion 3, a dispensing mechanism 6 capable of arc (rotation) movement and vertical movement and including a dispensing nozzle is provided. The dispensing nozzle moves while drawing an arc around a rotation axis, and performs dispensing from the reagent bottle 4*b* or the sample container 5 to the reaction container 2. On a trajectory of the dispensing nozzle, there are a reagent aspiration position and a sample aspiration position on the reagent and sample common accommodating portion 3, a dispensing position on the incubator 1, and a cleaning tank 7 for cleaning the dispensing nozzle.

The sample and the reagent are aspirated by the dispensing nozzle, and the sample and the reagent are stirred and mixed by aspiration and discharge operations by the dispensing nozzle in the reaction container 2. In this way, since the sample and the reagent are stirred by a pipetting operation by the dispensing nozzle, a stirring mechanism for stirring the sample and the reagent can be no longer necessary. The reaction container 2 that accommodates a reaction solution in which the sample and the reagent are mixed is controlled to a predetermined temperature by the incubator 1, and the reaction is promoted for a predetermined time.

When the automatic analyzer is used for a biochemical test, a spectrophotometer 8 is disposed around the incubator 1. The spectrophotometer 8 includes a light source and a detector (not shown), and measures an absorbance of the reaction solution by spectroscopically detecting transmitted light obtained by irradiating the reaction solution in which the sample and the reagent are mixed with the light source. A detection principle of the automatic analyzer is not limited to the biochemical test. For example, when the automatic analyzer is used for an immunological test, the spectrophotometer 8 is not necessary, and an immunological analysis unit (for example, a unit that measures an amount of luminescence derived from a luminescence reaction of a labeling substance using electrochemical luminescence or chemical luminescence as a principle and a photomultiplier tube as a detector) is provided. Further, when the automatic analyzer is a composite type for a biochemical test and an immunological test, both the spectrophotometer 8 and the immunological analysis unit are provided.

Each mechanism of the automatic analyzer is connected to a control unit 10. The control unit 10 controls operations of various mechanisms such as rotation driving of the incubator 1, a rotation operation inside the reagent and sample common accommodating portion 3, driving and dispensing operations of the dispensing mechanism 6, and cleaning for the dispensing nozzle by the cleaning tank 7. In FIG. 1, for simplicity of illustration, connection between each mechanism that constitutes the automatic analyzer and the control unit 10 is omitted.

FIG. 2A shows a procedure of a normal dispensing operation performed by the dispensing mechanism 6. Since the dispensing mechanism 6 continuously dispenses the sample and the reagent with the same dispensing nozzle, the reagent is first aspirated in the normal dispensing operation so that the sample is not mixed into the reagent container 4.

(A1) The dispensing mechanism 6 moves a dispensing nozzle 201 onto the reagent container 4 on the reagent and sample common accommodating portion 3, and aspirates a predetermined amount of reagent.

(A2) The dispensing mechanism 6 moves the dispensing nozzle 201 to the cleaning tank 7, and the cleaning tank 7 cleans an outer side of the dispensing nozzle 201 (external cleaning).

(A3) The dispensing mechanism 6 moves the dispensing nozzle 201 onto the sample container 5 on the reagent and sample common accommodating portion 3, and aspirates a predetermined amount of sample.

(A4) The dispensing mechanism 6 moves the dispensing nozzle 201 onto the reaction container 2 on the incubator 1, and discharges the aspirated reagent and sample into the reaction container 2. By this discharge operation, the reagent and the sample are stirred and mixed. In this case, it is desirable to aspirate a mixed liquid of the reagent and the sample in the reaction container 2 and re-discharge the mixed liquid of the reagent and the sample for one or more times to more uniformly mix the reagent and the sample.

(A5) The dispensing mechanism 6 moves the dispensing nozzle 201 to the cleaning tank 7, and the cleaning tank 7 cleans the outer side and an inner side of the dispensing nozzle 201 (external cleaning and internal cleaning).

FIG. 2B shows a procedure of a carry-over avoidance dispensing operation performed by the dispensing mechanism 6. In the normal dispensing operation shown in FIG. 2A, the reagent adhering to the inner side of the dispensing nozzle 201 may be mixed into the sample container 5 during sample aspiration. Therefore, in a case in which the reagent is mixed into the sample accommodated in the sample container 5, which may adversely affect analyses on subsequent test items, the control unit 10 executes the carry-over avoidance dispensing operation shown in FIG. 2B instead of the normal dispensing operation. In the carry-over avoidance dispensing operation, the sample to be dispensed is once transferred from the sample container 5 to another container, and the dispensing operation is performed from the other container, thereby preventing the reagent from being mixed into the sample container 5.

(B1) The dispensing mechanism 6 moves the dispensing nozzle 201 onto the sample container 5 on the reagent and sample common accommodating portion 3, and aspirates a predetermined amount of sample.

(B2) The dispensing mechanism 6 moves the dispensing nozzle 201 onto a first reaction container 2*a* on the incubator 1 and discharges the aspirated sample to the first reaction container 2*a*.

(B3) The dispensing mechanism 6 moves the dispensing nozzle 201 to the cleaning tank 7, and the cleaning tank 7 cleans the outer side and the inner side of the dispensing nozzle 201 (external cleaning and internal cleaning).

(B4) The dispensing mechanism 6 moves the dispensing nozzle 201 onto the reagent container 4 on the reagent and sample common accommodating portion 3, and aspirates a predetermined amount of reagent.

(B5) The dispensing mechanism 6 moves the dispensing nozzle 201 to the cleaning tank 7, and the cleaning tank 7 cleans the outer side of the dispensing nozzle 201 (external cleaning).

(B6) The dispensing mechanism 6 moves the dispensing nozzle 201 onto the first reaction container 2*a* on the incubator 1, and aspirates a predetermined amount of sample from the first reaction container 2*a*.

(B7) The dispensing mechanism 6 moves the dispensing nozzle 201 onto a second reaction container 2*b* on the incubator 1, and discharges the aspirated reagent and sample to the second reaction container 2*b*. By this discharge operation, the reagent and the sample are stirred and mixed. In this case, it is desirable to aspirate a mixed liquid of the reagent and the sample in the second reaction container 2*b* and re-discharge the mixed liquid of the reagent and the sample for one or more times to more uniformly mix the reagent and the sample.

(B8) The dispensing mechanism 6 moves the dispensing nozzle 201 to the cleaning tank 7, and the cleaning tank 7 cleans the outer side and inside of the dispensing nozzle 201 (external cleaning and internal cleaning).

The procedures (B1) to (B8) do not need to be continuously performed, and may be separately performed as a first sequence of the procedures (B1) to (B3) and a second sequence of the procedures (B4) to (B8). When two sequences are separated, the following operation is performed. In a cycle before a cycle of executing the second sequence, the first sequence is executed to dispense the sample into the first reaction container 2*a* located at an access point of the dispensing nozzle (procedures (B1) to (B3)). After a predetermined time has elapsed (for example, after several tens of seconds), the second sequence is executed at a timing when both the first reaction container 2*a* and the second reaction container 2*b* are located at the access point of the dispensing nozzle (procedures (B4) to (B8)).

In such a carry-over avoidance dispensing operation, since the sample transferred from the sample container 5 to the first reaction container 2*a* in the procedure (B2) may be mixed with the reagent after the procedure (B6), the remaining sample cannot always be used for subsequent tests. Normally, since the analysis is performed on a plurality of measurement items for the sample in the sample container 5, it is desirable to reduce the amount of the sample dispensed from the sample container 5 to the first reaction container 2*a* in the procedures (B1) to (B2) as much as possible in order to prevent the sample accommodated in the sample container 5 from being finally insufficient. However, when the amount of the sample accommodated in the first reaction container 2*a* is small, a failure may occur in the sample aspiration operation in the procedure (B6).

FIG. 3A shows an operation in which the dispensing mechanism 6 aspirates the sample from the reaction container 2 (a first operation). The first operation is a standard aspiration operation when the dispensing mechanism 6 aspirates a liquid from the reaction container 2. A state (S01) is an initial state, and a top end of the dispensing nozzle 201 is located at a height h1 from a bottom surface of the reaction container 2. In this case, since a bottom surface area of the reaction container 2 is known, a height h2A of a liquid surface from the bottom surface in the reaction container 2 can be calculated based on an amount of the sample discharged in the procedure (B2). A state (S02) indicates a state in which the dispensing nozzle 201 is lowered to an aspiration position. A lowered length of the dispensing nozzle 201 in the standard aspiration operation is h1-(h2A-c). An insertion length $\varepsilon$ is set in advance in the automatic analyzer. When the insertion length $\varepsilon$ of the top end of the dispensing nozzle 201 into the sample is too short, in a case in which a deviation occurs between the calculated height of the liquid surface and an actual height of the liquid surface due to surface tension or fluctuation of the sample, attachment tolerance of the dispensing nozzle or the reaction container, or the like, a trouble such as air being involved in the sample aspiration may occur. On the other hand, when the insertion length $\varepsilon$ is too long, there is a disadvantage that a cleaning range (outer side cleaning) of the dispensing nozzle 201 is large. Therefore, although there is a need to make the insertion length $\varepsilon$ as short as possible, the insertion length $\varepsilon$ is set to a length that enables the aspiration operation to be stably performed (state (S03)). Therefore, for example, when the amount of the sample to be discharged to the first reaction container 2*a* in the procedure (B2) is set to an amount such that the height of the liquid surface is equal to or less than s, the sample cannot be aspirated by the standard aspiration operation in the procedure (B6).

Figure 3B:
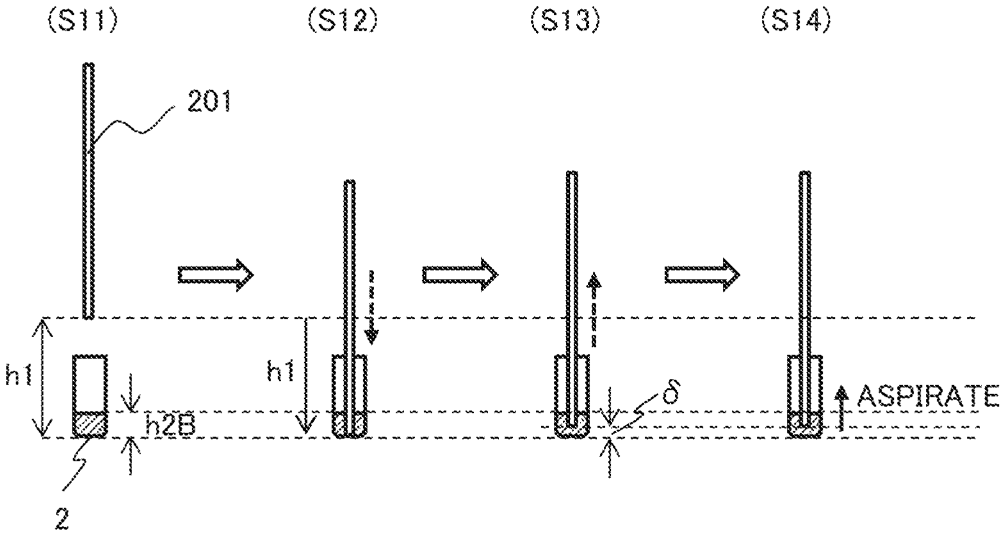
FIG. 3B is a diagram showing a small-amount aspiration operation.

Therefore, in the present embodiment, a second operation (small-amount aspiration operation) of aspirating the liquid from the reaction container 2 is set, in which the aspiration operation can be performed even when the amount of the sample to be dispensed into the first reaction container 2*a* is a dispensing amount such that the height of the liquid surface is equal to or less than $\varepsilon$. When the amount of the sample to be dispensed into the first reaction container 2*a* is less than a predetermined threshold value, the small-amount aspiration operation shown in FIG. 3B is applied to the aspiration operation in the procedure (B6).

A state (S11) is an initial state, the top end of the dispensing nozzle 201 is located at the height h1 from the bottom surface of the reaction container 2, and a height of the liquid surface from the bottom surface in the reaction container 2 is a height h2B. Subsequently, the dispensing nozzle 201 is lowered until the top end of the dispensing nozzle 201 reaches a bottom of the reaction container 2 (a state (S12)), and then the dispensing nozzle 201 is raised by a certain distance $\delta$ ($\delta<\varepsilon$) (a state (S13)). The sample is aspirated in a state in which the top end of the dispensing nozzle 201 is located at a height of $\delta$ from the bottom surface of the reaction container 2 (a state (S14)).

The insertion length c set in the standard aspiration operation is set to enable stable aspiration assuming that a reaction solution in which a sample and a pretreatment solution are mixed or a diluted sample obtained by diluting a sample with a dilute solution is aspirated. On the other hand, since the sample itself is accommodated in the reaction container 2 in the procedure (B6), the amount of the liquid accommodated in the reaction container 2 and the amount of the liquid aspirated by the dispensing nozzle in the procedure (B6) are both remarkably smaller than the amount assumed in the standard aspiration operation. Therefore, when the sample is dispensed from the sample container 5 to the first reaction container 2*a* to an extent that the standard aspiration operation can be performed, an amount of the sample to be discarded increases. By setting the small-amount aspiration operation, even when only a small amount of sample is accommodated in the reaction container 2, a stable aspiration operation can be performed, and the amount of the sample to be discarded can be reduced.

The control unit 10 determines whether the dispensing operation performed by the dispensing mechanism 6 is the normal dispensing operation in FIG. 2A or the carry-over avoidance dispensing operation in FIG. 2B. Based on measurement request information on the sample, the control unit 10 makes a determination based on whether there is a risk that analyses on subsequent measurement items are adversely affected due to mixing of the reagent. FIG. 4 shows measurement request information data 401 input to the automatic analyzer. The measurement request information data 401 includes sample type information 402 and measurement item information 403. The sample type information 402 indicates a type of a sample, such as serum, plasma, or urine. The measurement item information 403 indicates a measurement item for the sample, and thus a reagent used for the measurement is specified.

The control unit 10 has a determination table 501 for selecting a dispensing operation based on the sample type information 402 and the measurement item information 403 of the measurement request information data 401 or a combination of the sample type information 402 and the measurement item information 403. FIG. 5A is an example of a determination table 501*a* for selecting a dispensing operation based on sample type information. A protein contained in a reagent is considered as an example that may adversely affect an analysis. For example, in a case of a sample originally containing a large amount of protein, it can be said that an analysis result does not vary due to mixing of a trace amount of reagent. Therefore, the determination table 501*a* is set in association with a sample type and whether the carry-over avoidance dispensing operation is applied. Similarly, when the dispensing operation is selected based on measurement item information, the control unit 10 holds a determination table in which a sample type column in the determination table 501*a* is changed to a measurement item column.

FIG. 5B is an example of a determination table 501*b* for selecting a dispensing operation based on a combination of the sample type information and the measurement item information. Depending on the measurement item, only a reagent that does not affect the analysis result even mixed is used. By using the determination table 501*b*, the carry-over avoidance dispensing operation can be performed only for the combination of the sample type and the measurement item that affects the measurement result.

Although the embodiment of the invention has been described above, the invention is not limited to the above embodiment, and includes various modifications. Hereinafter, modifications will be described.

Modification 1

When the sample dispensed into and remaining in the first reaction container 2*a* affects the measurement item, it is necessary to discard the sample. However, when the sample does not affect the measurement item, it is possible to continuously use the sample dispensed into and remaining in the first reaction container 2*a* for another measurement.

Modification 2

In the present embodiment, an example is described in which application of the carry-over avoidance dispensing operation is determined based on the sample type information, the measurement item information, or the combination of the sample type information and the measurement item information. However, the application of the carry-over avoidance dispensing operation may be determined based on other information, for example, a state of the automatic analyzer.

For example, when the automatic analyzer is in a state in which maintenance of the dispensing nozzle by an operator is not performed and the sample type is easily affected by the contamination by the reagent, the carry-over avoidance dispensing operation is applied. When the maintenance of the dispensing nozzle is not executed, the dispensing nozzle is in a state in which a risk of contamination is likely to occur, and thus the carry-over avoidance dispensing operation is applied such that the contamination due to dirt in the dispensing nozzle does not occur. Execution/non-execution of the maintenance of the dispensing nozzle can be determined based on an operation log of the analyzer.

Alternatively, even when a QC measurement result is out of a reference range, and the measurement is performed as it is, the carry-over avoidance dispensing operation is applied regardless of the sample type in this case. The dirt in the dispensing nozzle may be a reason why the QC measurement result is out of the reference range. Therefore, the carry-over avoidance dispensing operation is applied such that the contamination due to the dirt in the dispensing nozzle does not occur.

The above embodiment and modifications have been described in detail for easy understanding of the invention, and the invention is not necessarily limited to those including all the configurations described above. For example, although an example has been described in which the sample is temporarily dispensed into the reaction container 2*b* on the incubator 1 in the carry-over avoidance dispensing operation, in a case in which there is a holding portion that temporarily holds the dispensed sample, the sample may be held by the holding portion.

REFERENCE SIGNS LIST

1: incubator
2: reaction container
3: reagent and sample common accommodating portion
4: reagent container
4*b*: reagent bottle
5 sample container
6: dispensing mechanism
7: cleaning tank
8: spectrophotometer
10 control unit
201: dispensing nozzle
401: measurement request information data
402: sample type information
403: measurement item information
501: determination table

The invention claimed is:

1. An automatic analyzer comprising:
a dispensing mechanism that includes a dispensing nozzle and dispenses a sample or a reagent into a reaction container;
a cleaning tank that cleans the dispensing nozzle; and
a control unit configured to control the dispensing mechanism and the cleaning tank according to a first dispensing operation and a second dispensing operation,
wherein the first dispensing operation includes:
a first procedure in which the dispensing mechanism aspirates the reagent accommodated in a reagent container by the dispensing nozzle, a second procedure in which the cleaning tank cleans an outer side of the dispensing nozzle after the first procedure, a third procedure in which the dispensing mechanism aspirates the sample accommodated in a sample container by the dispensing nozzle after the second procedure, and a fourth procedure in which the dispensing mechanism discharges the reagent and the sample aspirated in the first procedure and the third procedure to the reaction container after the third procedure, wherein the second dispensing operation includes:

a first procedure in which the dispensing mechanism aspirates the sample accommodated in the sample container by the dispensing nozzle, a second procedure in which the dispensing mechanism discharges the sample aspirated in the first procedure to a first reaction container after the first procedure, a third procedure in which the cleaning tank cleans an inner side and the outer side of the dispensing nozzle after the second procedure, a fourth procedure in which the dispensing mechanism aspirates the reagent accommodated in the reagent container by the dispensing nozzle after the third procedure, a fifth procedure in which the cleaning tank cleans the outer side of the dispensing nozzle after the fourth procedure, a sixth procedure in which the dispensing mechanism aspirates the sample accommodated in the first reaction container by the dispensing nozzle after the fifth procedure, and a seventh procedure in which the dispensing mechanism discharges the reagent and the sample aspirated in the fourth procedure and the sixth procedure to a second reaction container after the sixth procedure, and wherein the control unit is configured to determine whether to perform the first dispensing operation or the second dispensing operation for the sample based on measurement request information data of the sample, and upon determining to perform the first dispensing operation, control the dispensing mechanism and the cleaning tank according to the first dispensing operation, and upon determining to perform the second dispensing operation, control the dispensing mechanism and the cleaning tank according to the second dispensing operation.

2. The automatic analyzer according to claim 1, wherein in the fourth procedure in the first dispensing operation, the dispensing mechanism aspirates a mixed liquid of the reagent and the sample in the reaction container and re-discharges the mixed liquid for one or more times, and in the seventh procedure in the second dispensing operation, the dispensing mechanism aspirates the mixed liquid of the reagent and the sample in the second reaction container and re-discharges the mixed liquid for one or more times.

3. The automatic analyzer according to claim 1, wherein in the sixth procedure in the second dispensing operation, when an aspiration amount of the sample in the second procedure in the second dispensing operation is equal to or greater than a predetermined threshold value, the dispensing mechanism lowers the dispensing nozzle so that a top end of the dispensing nozzle reaches a predetermined depth from a liquid surface of the first reaction container, and then aspirates the sample accommodated in the first reaction container by the dispensing nozzle.

4. The automatic analyzer according to claim 3, wherein in the sixth procedure in the second dispensing operation, when the aspiration amount of the sample in the second procedure in the second dispensing operation is less than the predetermined threshold value, the dispensing mechanism lowers the dispensing nozzle so that the top end of the dispensing nozzle reaches a bottom surface of the first reaction container, raises the dispensing nozzle to a predetermined height, and then aspirates the sample accommodated in the first reaction container by the dispensing nozzle.

5. The automatic analyzer according to claim 1, wherein the control unit executes the first to third procedures of the second dispensing operation as a series of first sequences, and executes the fourth to seventh procedures of the second dispensing operation as a series of second sequences after predetermined time after the first sequences.

6. The automatic analyzer according to claim 5, further comprising:

an incubator that is rotationally driven and in which the reaction container used in the first dispensing operation and reaction containers including the first reaction container and the second reaction container used in the second dispensing operation are arranged in a circumferential shape; and a spectrophotometer that performs a biochemical test on a reaction solution of the sample and the reagent in the reaction containers arranged in the incubator.

7. The automatic analyzer according to claim 1, wherein the control unit determines whether to perform the first dispensing operation or the second dispensing operation based on sample type information on the sample in the measurement request information data of the sample.

8. The automatic analyzer according to claim 1, wherein the control unit determines whether to perform the first dispensing operation or the second dispensing operation based on measurement item information on the sample in the measurement request information data of the sample.

9. The automatic analyzer according to claim 1, wherein the control unit determines whether to perform the first dispensing operation or the second dispensing operation based on a combination of sample type information and measurement item information on the sample in the measurement request information data of the sample.

10. The automatic analyzer according to claim 1, wherein the control unit determines whether to perform the first dispensing operation or the second dispensing operation based on a state of the automatic analyzer.

* * * * *